United States Patent [19]

Bak

[11] Patent Number: 4,819,424
[45] Date of Patent: Apr. 11, 1989

[54] SWIRL STABILIZED RAM AIR TURBINE ENGINE

[75] Inventor: Michael J. Bak, Union Lake, Mich.

[73] Assignee: Williams International Corporation, Walled Lake, Mich.

[21] Appl. No.: 97,103

[22] Filed: Sep. 16, 1987

[51] Int. Cl.$^4$ .......................... F02C 7/22; F02K 7/10
[52] U.S. Cl. .................................. 60/39.183; 60/745; 60/270.1
[58] Field of Search .................... 60/39.183, 744, 745, 60/39.33, 270.1

[56] References Cited

U.S. PATENT DOCUMENTS

| | | | |
|---|---|---|---|
| 2,108,872 | 2/1938 | Swallow | 60/744 |
| 2,602,292 | 7/1952 | Buckland et al. | 60/744 |
| 3,105,661 | 10/1963 | Ferri | 60/270.1 |
| 4,368,620 | 1/1983 | Giles | 60/270.1 |

Primary Examiner—Louis J. Casaregola
Attorney, Agent, or Firm—Lyman R. Lyon

[57] ABSTRACT

A ramjet combustor operates on a slurry fuel that is atomized to 25 microns or less droplet size. A ram air turbine drives a fuel slinger which injects the fuel into the swirl stabilized ramjet combustor.

1 Claim, 1 Drawing Sheet

4,819,424

SWIRL STABILIZED RAM AIR TURBINE ENGINE

BACKGROUND OF THE INVENTION

A need has been identified for a low altitude ram air turbine engine that operates on high energy fuel. Preferably, the engine utilizes a swirl stabilized combustion chamber.

SUMMARY OF THE INVENTION

The aforesaid requirement is satisfied by the instant invention which utilizes a ramjet combustor that operates on a slurry fuel comprised of a liquid hydrocarbon fuel and particles of a combustible material such as sixty percent (60%) boron slurry fuel that is atomized to 25 microns or less droplet size. A ram air turbine drives a fuel slinger which injects the slurried fuel into a swirl stabilized ramjet combustor. Swirl stabilization is utilized to shorten the typical ramjet combustor to approximately 60 percent of the length of a conventional body stabilized burner.

Figure 1:
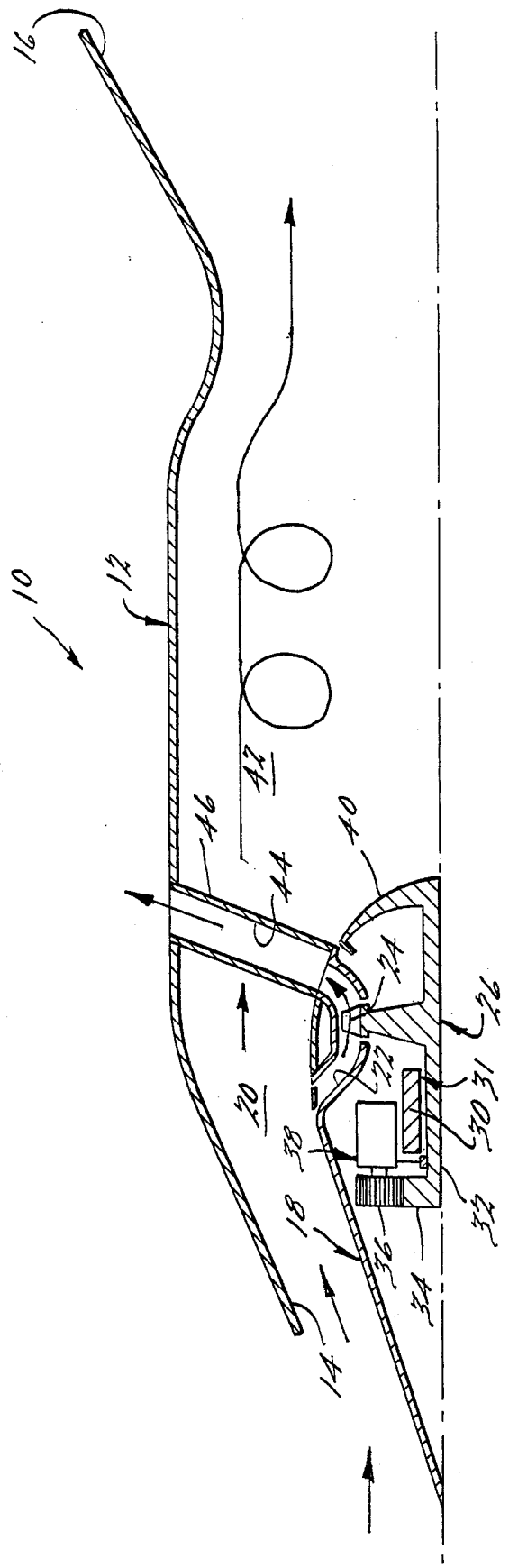
FIG. 1 is a schematic view of a ramjet engine in accordance with the instant invention.
Figure 2:
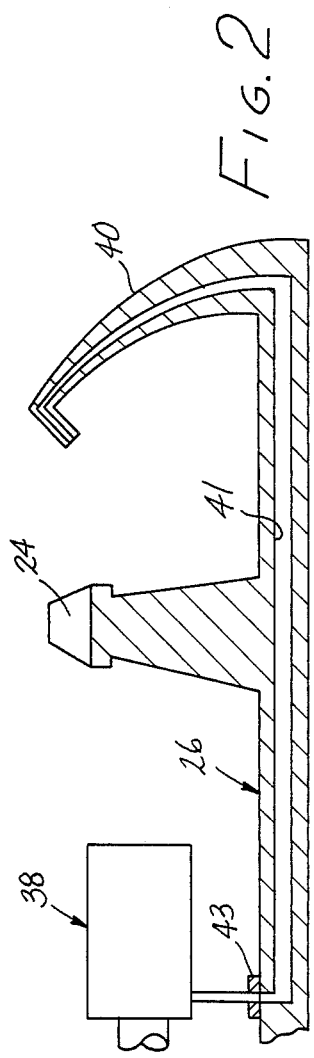
FIG. 2 is a cross-sectional view of the turbine shaft showing the fuel passage therein.

As seen in the drawing, a ram air turbine engine 10 comprises a tubular housing 12 having an intake opening 14 at one end and an exhaust nozzle 16 at an opposite end. A nose cone or inlet spike 18 is disposed centrally of the intake opening 14 so as to duct ram air radially outwardly into a conical passage 20.

Air flowing through the passage 20 is divided so that a portion thereof flows radially inwardly through a turbine inlet duct 22. A blade 24 of a ram air turbine 26 extends into the duct 22 so as to be driven by air flowing therethrough.

The windings 30 of a shaft speed generator 31 are disposed about a shaft 32 of the turbine 26. The shaft 32 of the turbine 26 also supports a gear 34 which meshes with a complementary gear 36 of a fuel pump 38.

In accordance with one feature of the instant invention, the shaft of 32 directly supports an integral fuel slinger 40 that because of the overall geometry of the herein disclosed turbine engine, slings a slurry fuel radially outwardly directly into a combustion chamber. An integral passage 41 in the turbine shaft 32 conducts fuel from the pump 38 through a slip fitting 43 to the fuel slinger 40.

In accordance with another feature of the instant invention, the turbine duct 22 is vented radially outwardly through a central passage 44 in a swirl vane 46. Any desired number of vanes 46 may be employed to swirl stabilize the air flowing from the conical passage 20 so as to insure complete mixing thereof with fuel ejected by the slinger 40 and to effect a significant reduction in the length of the combustor portion 42 of the ramjet housing 12.

While the preferred embodiment of the invention has been disclosed, it should be appreciated that the invention is susceptible of modification without departing from the scope of the following claims.

I claim:
1. A ram air turbine engine comprising
   an elongated cylindrical combustor housing having an air inlet at a front end thereof and a nozzle at a rear end thereof,
   a turbine housing disposed centrally of said combustor housing at the front end thereof having a conical frontal portion,
   a hollow swirl vane extending radially outwardly from said turbine housing and communicating with the interior thereof and exterior of said combustor housing,
   a bypass air passage in said turbine housing communicating with said combustor air inlet and said hollow swirl vane,
   a ram air turbine in said turbine housing having a blade extending into said bypass passage,
   a fuel slinger mounted directly on said turbine and within said turbine housing and rearwardly of said swirl vane for slinging a slurry fuel radially outwardly from said turbine housing into said combustor, and
   a fuel pump within said turbine housing and driven by said turbine for pumping fuel to said fuel slinger.

* * * * *